(12) United States Patent
Nakatani

(10) Patent No.: US 8,315,134 B2
(45) Date of Patent: Nov. 20, 2012

(54) OPTICAL DISK CONTAINING INFORMATION ABOUT USABILITY OF RECORDING LAYERS AND OPTICAL DISK APPARATUS FOR REPRODUCING THE OPTICAL DISK

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 86 days.

(21) Appl. No.: 12/553,651

(22) Filed: Sep. 3, 2009

(65) Prior Publication Data
US 2010/0061204 A1    Mar. 11, 2010

(51) Int. Cl.
*G11B 7/24* (2006.01)
(52) U.S. Cl. ............................ 369/47.15; 369/94
(58) Field of Classification Search .......... *G09B 19/021*
See application file for complete search history.

(56) References Cited

U.S. PATENT DOCUMENTS

| | | | |
|---|---|---|---|
| 2004/0013074 A1* | 1/2004 | Lee et al. | 369/94 |
| 2005/0099916 A1* | 5/2005 | Jeon et al. | 369/47.54 |
| 2005/0141379 A1* | 6/2005 | Yamamoto et al. | 369/53.2 |
| 2007/0253306 A1* | 11/2007 | Takahashi et al. | 369/94 |
| 2008/0219142 A1* | 9/2008 | Fukushima | 369/283 |
| 2009/0129252 A1* | 5/2009 | Endoh et al. | 369/275.4 |

FOREIGN PATENT DOCUMENTS

| | | |
|---|---|---|
| JP | 2001-167509 A | 6/2001 |
| JP | 2007-220294 | 8/2007 |
| JP | 2009-176335 A | 8/2009 |
| WO | WO 2006/038633 A1 | 4/2006 |
| WO | WO 2007058375 A1 * | 5/2007 |

OTHER PUBLICATIONS

Notification of Reasons for Refusal for related Japanese Application No. 2008-232585 dated Jun. 12, 2012, pp. 1-8.

* cited by examiner

*Primary Examiner* — Hoa T Nguyen
*Assistant Examiner* — Mark Fischer
(74) *Attorney, Agent, or Firm* — Ditthavong Mori & Steiner, P.C.

(57) ABSTRACT

A disk has a plurality of recording layers in a laminated direction. When a defect occurs in any one of recording layers during disk manufacture, information about the defect is recorded in a read-only region in the recording layer. An optical disk apparatus determines which of the recording layers is usable based on the information about the defect read from the disk, and executes a recording/reproducing operation according to a determination result. Therefore, even when a disk with a defect in the recording layer is used, that disk may be offered to a user as an appropriately usable disk.

4 Claims, 13 Drawing Sheets

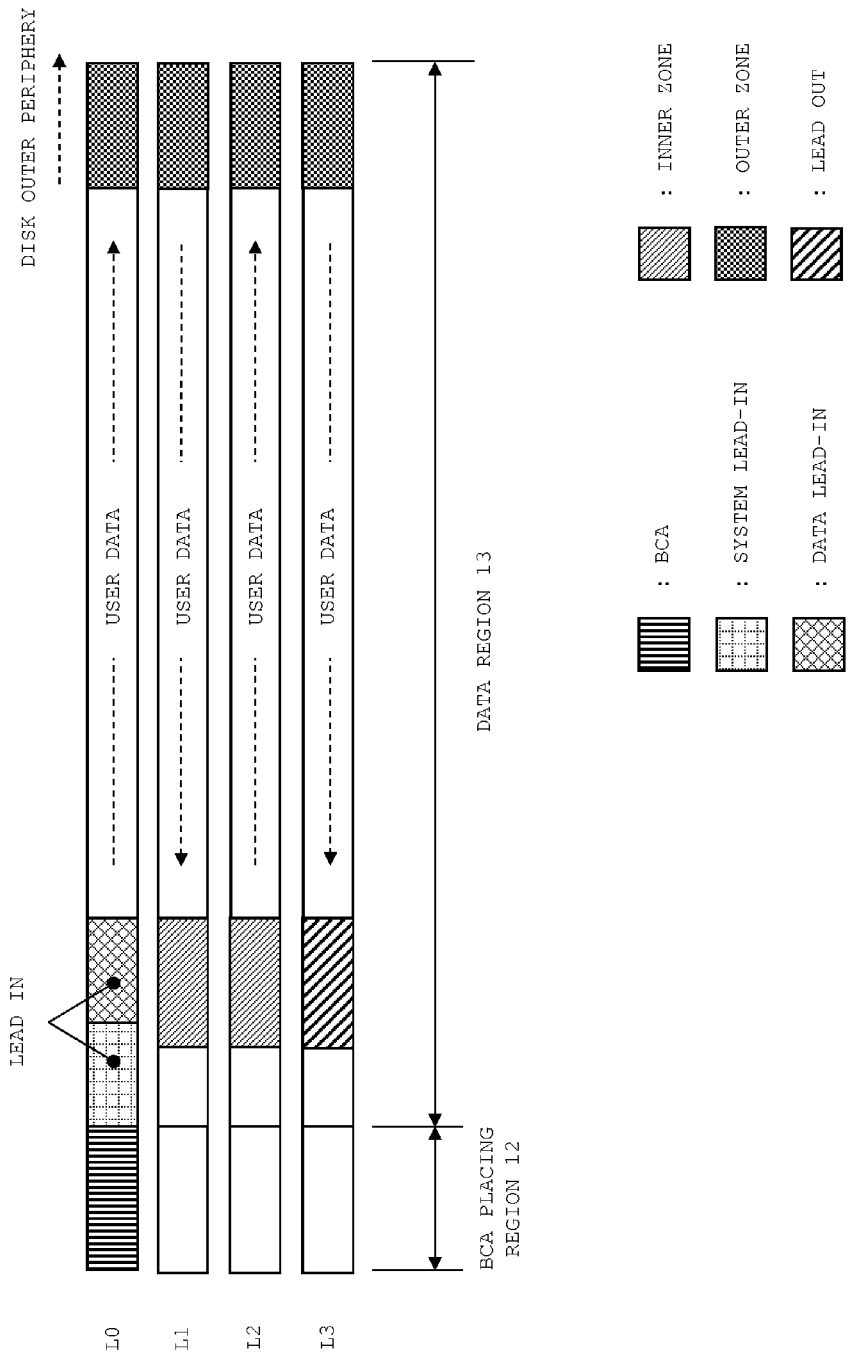

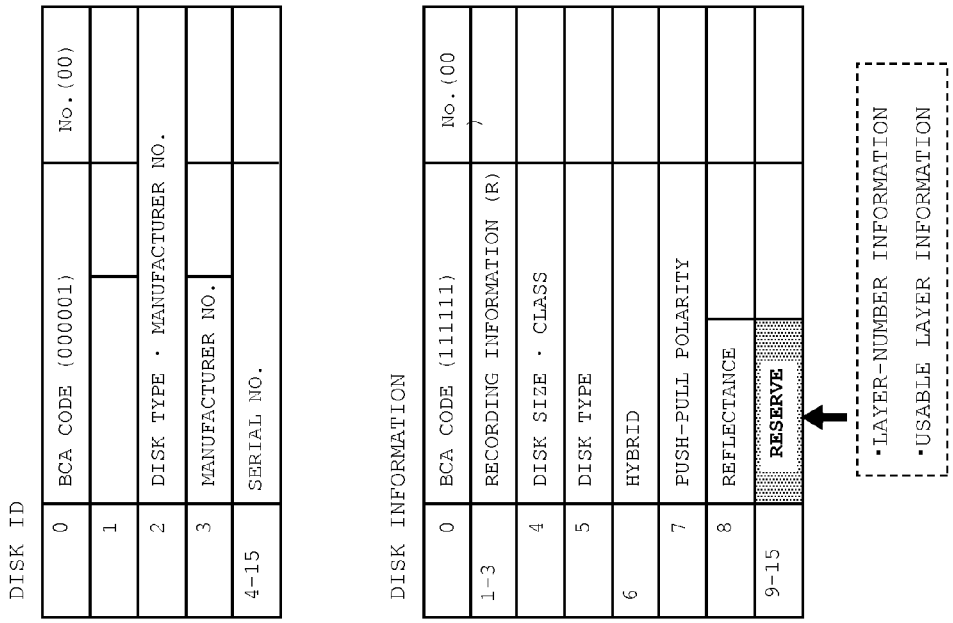
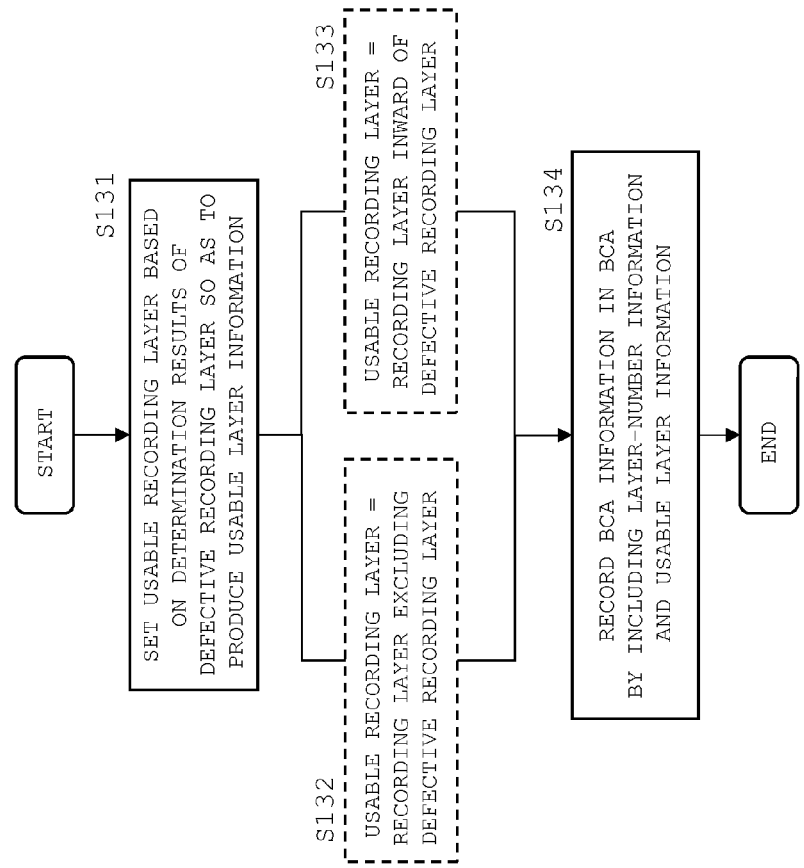

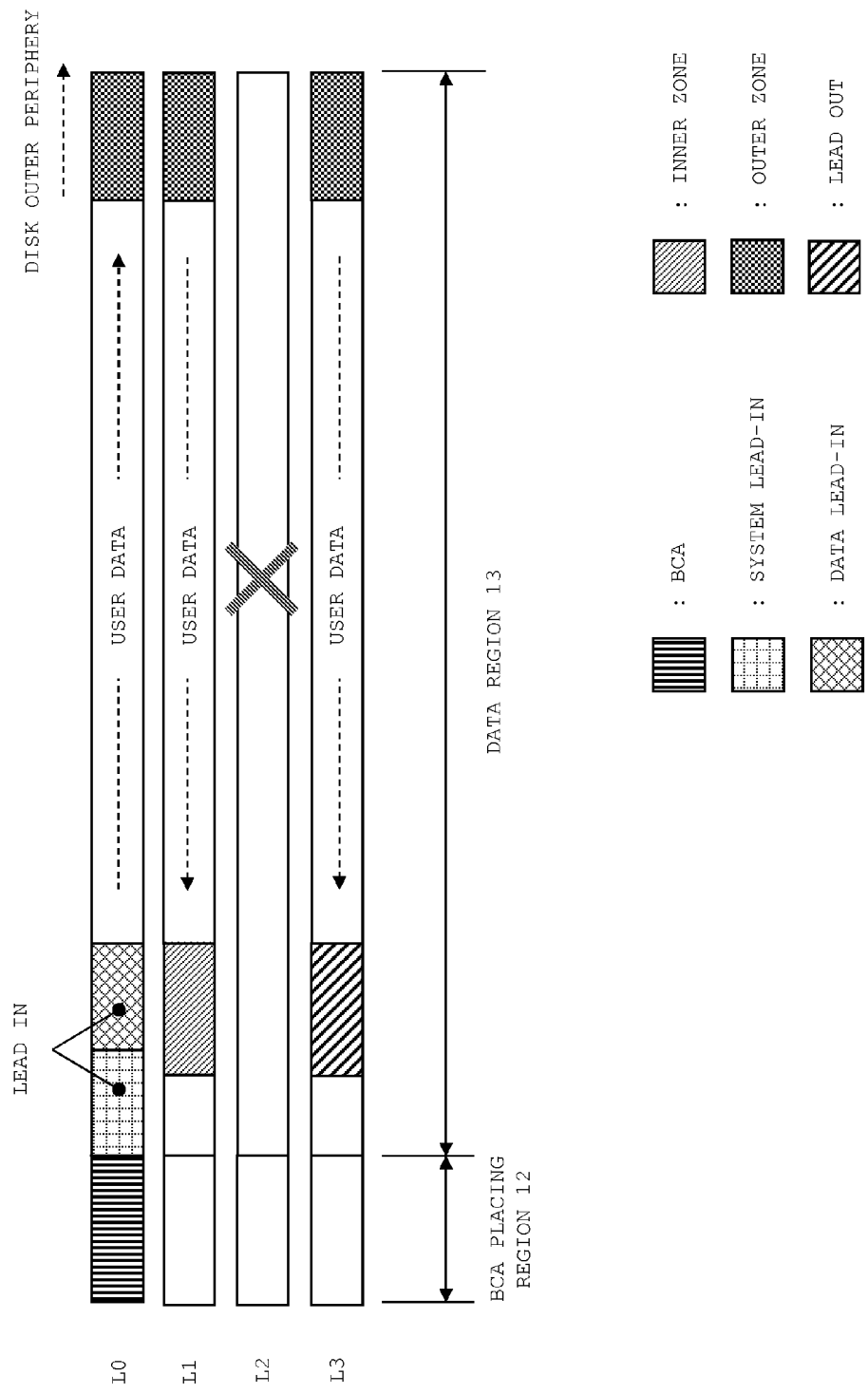

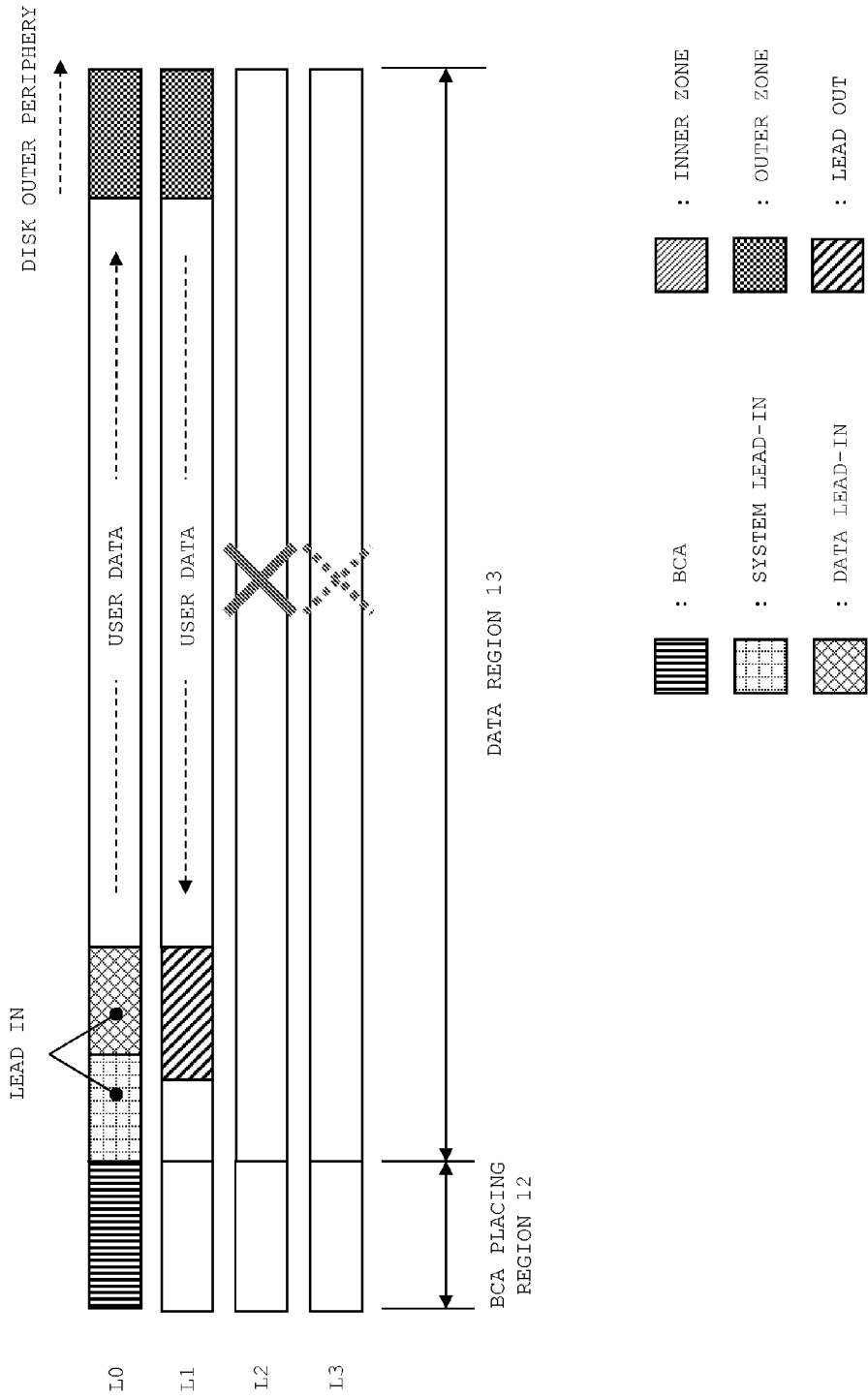

OPTICAL DISK CONTAINING INFORMATION ABOUT USABILITY OF RECORDING LAYERS AND OPTICAL DISK APPARATUS FOR REPRODUCING THE OPTICAL DISK

This application claims priority under 35 U.S.C. Section 119 of Japanese Patent Application No. 2008-232585 filed Sep. 10, 2008, entitled "OPTICAL DISK AND OPTICAL DISK APPARATUS". The disclosure of the above application is incorporated herein by reference.

BACKGROUND OF THE INVENTION

1. Field of the Invention

The present invention relates to a recordable optical disk having a plurality of recording layers in a laminated direction, and to an optical disk apparatus preferably used for the disk.

2. Disclosure of the Related Art

Currently, Blu-ray disks (hereafter, "BD") are commercially available as a large capacity recording medium. A recordable type of BD enables 25-gigabyte data recording in a single layer and 50-gigabyte data recording in two layers. By increasing the number of recording layers included in a single BD, it is possible to further increase the recording capacity.

The following steps may be employed when forming a plurality of recording layers in a BD.

(1) Injection molding is used to form an undulating shape in a first layer (recording layer L0) on a substrate;

(2) A reflecting film is formed by sputtering on the formed undulating shape;

(3) A UV resin is coated on the reflecting film (intermediate layer);

(4) A stamper having an undulating shape for a second layer (recording layer L1) is pressed into contact with the UV resin;

(5) The UV resin is cured by irradiation with ultraviolet radiation, and thereafter, the stamper is drawn and peeled off;

(6) A diffusion shell on the UV resin is formed by sputtering;

(7) The steps (3) to (6) are repeated according to the number of recording layers;

(8) A UV resin is coated on the diffusion shell (cover layer); and (9) The UV resin is cured by irradiation with ultraviolet radiation.

In substitution of the steps (8) and (9), a technique of forming a cover layer by adhering a sheet formed from polycarbonate can be used.

In this manner, when disposing a plurality of recording layers on a single BD, it is necessary to repeat the steps such as sputtering, coating of UV resin, and curing for a plurality of number of times.

When disposing a plurality of recording layers in a BD, considerable defects may occur in the recording layers due to unacceptable decentering in the tracks on the recording layers during the step of manufacturing the disk. Conventionally, when a considerable defect is present in even one of a plurality of recording layers, that disk is discarded as a defective article. However, as a result, the manufacturing costs associated with the discarded disks are lost and also waste of materials is caused.

SUMMARY OF THE INVENTION

The present invention has been achieved to solve such problems, and a principal object thereof is to provide an optical disk capable of avoiding loss of disk manufacturing costs and suppressing waste of materials. Another object thereof is to provide an optical disk apparatus capable of smoothly handling the optical disk.

A first aspect of the present invention relates to a recordable optical disk having a plurality of recording layers in a laminated direction. The optical disk is provided with a recordable region and a read-only region, and in the read-only region, information about usability of the recording layer is recorded.

A second aspect of the present invention relates to an optical disk apparatus for recording and reproducing information to and from an optical disk according to the first aspect. The optical disk apparatus is provided with a reproducing unit for reproducing the recordable region and the read-only region, a recording unit for recording the information in the recordable region, and a control unit for controlling the reproducing unit and the recording unit. The control unit sets a usable recording layer relative to the disk, based on the information about usability of the recording layer reproduced by the reproducing unit.

A third aspect of the present invention relates to an optical disk apparatus for reproducing information from an optical disk according to the first aspect. The optical disk apparatus is provided with a reproducing unit for reproducing the recordable region and the read-only region, and a control unit for controlling the reproducing unit. The control unit sets a recording layer reproducible relative to the disk, based on information about usability of the recording layers reproduced from the read-only region.

BRIEF DESCRIPTION OF THE DRAWINGS

The above and other objects and novel features of the present invention will become more completely apparent from the description of the embodiment below taken with the following accompanying drawings.

FIG. 3 shows an area format of each recording layer according to the embodiment;

FIG. 6A is a flowchart showing the production and a recording operation of BCA information according to the embodiment, and FIG. 6B is a diagram showing a data structure of the BCA information;

FIG. 10 is a diagram for explaining the recording operation according to the embodiment;

FIG. 11 is a diagram for explaining the recording operation according to the embodiment;

However, the diagrams are for the purposes of illustration only, and are not intended to limit the scope of the present invention.

DESCRIPTION OF PREFERRED EMBODIMENTS

An embodiment of the present invention will be described below with reference to the drawings. In this embodiment, the present invention is applied to a BD of a type allowing recording but not allowing re-writing and to a recording and reproducing device for the BD. In the embodiment below, a BD including four recording layers on a single disk is used as an example. However, the number of recording layers included in the disk is not limited to four. Hereafter, the description will simply refer to the BD as a disk 10.

Figure 1:
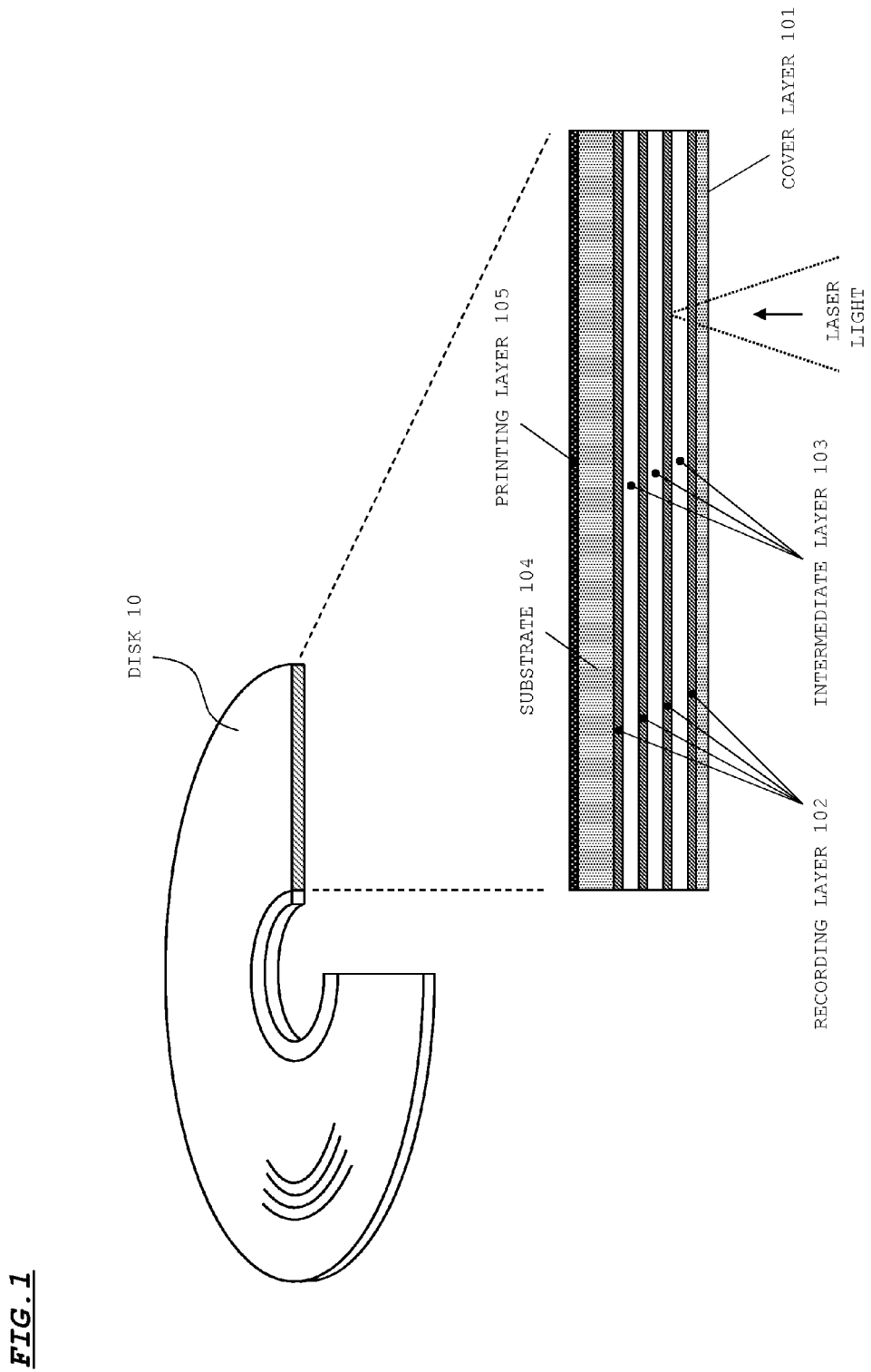
FIG. 1 shows the configuration of an optical disk according to an embodiment.

FIG. 1 shows the structure of the disk 10. As shown in FIG. 1, the disk 10 has a structure in which four recording layers 102, three intermediate layers 103, a substrate 104, and a printing layer 105 are laminated on a cover layer 101. The disk 10, for example, is produced by the producing steps (1) to (9) shown in the Background of the Invention. Thereafter, BCA information is recorded by burning, or any other similar process, the recording layer 102 using a high-output laser described later.

The cover layer 101 and the substrate 104 are formed from a material such as polycarbonate which allows transmission of laser light having a wavelength of approximately 400 nm. Other materials used for forming the cover layer 101 and the substrate 104 include biodegradable materials having a principal component of polyolefin, polylactic acid, etc. Out of the four recording layers 102, as viewed from a laser-light incidence side, the first layer (recording layer L3), the second layer (recording layer L2), and the third layer (recording layer L1) are formed from a semitransparent material. The innermost recording layer 102 (recording layer L0) is formed from a material having a high reflectance. A spiral groove is formed in the recording layer L0 and the recording layer L2 from an inner periphery towards an outer periphery of the disk. A spiral groove is formed in the recording layer L1 and the recording layer L3 from an outer periphery towards an inner periphery of the disk.

The material used in the substrate 104 is not limited to polycarbonate and other materials enabling retention of the recording layer may be used. The substrate 104 may be formed from paper or iron. Furthermore, in addition to phase-change materials such as azo organic dyes or GeSbTe, the material of the recording layer 102 may be inorganic materials such as Si/Cu lamination layers, $PtO_2$, and $TiO_2$.

Figure 2:
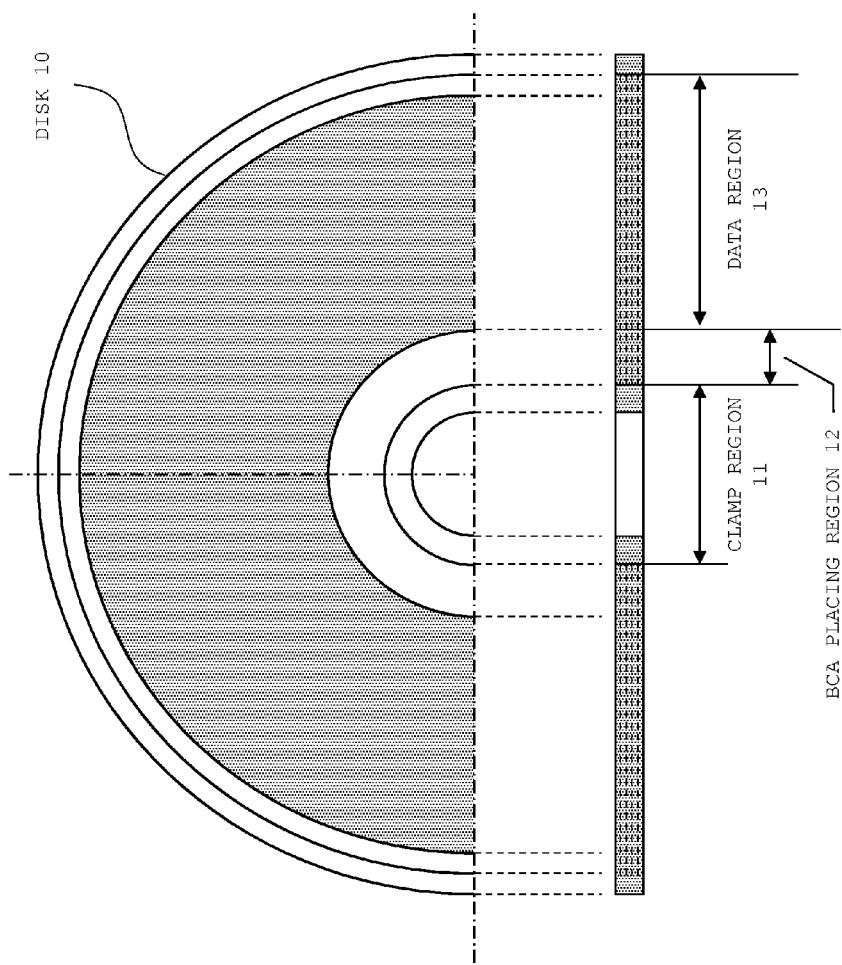
FIG. 2 shows an area format of an optical disk according to the embodiment.

FIG. 2 shows an area format of the disk 10.

The disk 10 is separated into areas in order from an inner periphery into a clamp region 11, a BCA placing region 12 and a data region 13.

In the BCA placing region 12, a burst cutting area (BCA) is placed only in the recording layer L0. Predetermined information relating to the disk is recorded in the BCA by intermittently extinguishing the recording layer 102 with respect to a disk circumferential direction. The extinction of the recording layer 102 is performed by a method of burning the recording layer 102 using a high-power laser or any other similar method. The information recorded on the BCA (hereafter, "BCA information") will be described in detail with reference to FIG. 6B.

When a beam spot is positioned on the BCA while the disk 10 is rotating, a light-dark contrast occurs in reflected light according to non-extinguished sections and extinguished sections of the recording layer. The BCA information is reproduced by demodulation of a change in the light-dark contrast.

A spiral groove is formed in each recording layer in the data region 13. Information (hereafter, "pre-recorded information") required for recording/reproducing the disk such as a recording power or a recording speed is recorded by displacement (wobble) of the groove formed in a system lead-in zone (described later) on the recording layer L0 with respect to a radial direction of the disk according to a predetermined modulating method. The details of the pre-recorded information will be described with reference to FIG. 13, later.

FIG. 3 shows an area format in each recording layer.

As shown in FIG. 3, the BCA is placed only in the BCA placing region 12 of the recording layer L0. The BCA is not placed in the BCA placing region 12 of the recording layers L1 to L3. Laser light incident from a cover layer 101 side transmits the recording layers L1 to L3 and is irradiated on the BCA of the recording layer L0. Although the groove is formed in the BCA placing region 12 in the recording layers L1 to L3, the BCA information is not recorded therein. The BCA is equivalent to a "reproduction-only region" of the present invention.

An innermost peripheral section of the data region 13 of the recording layer L0 is assigned to a system lead-in zone and, as described above, pre-recorded information required for recording/reproducing of the disk, such as recording power or recording speed, is recorded during disk manufacture using wobble. Although the recording layer 102 is also formed in the system lead-in zone, this zone is a reproduction-only region on a technical standard to enable appropriate reading out of the pre-recorded information. Other information such as user data is not recorded. Therefore, the system lead-in zone, similarly to the BCA above, corresponds to the "reproduction-only region" of the present invention.

After the system lead-in zone, a data lead-in zone is assigned in the inner peripheral section of the recording layer L0. A lead-in zone is configured by this data lead-in zone and the system lead-in zone. In the data lead-in zone, information (hereafter, "data lead-in information") for management of user data recorded in the user data zone is recorded. A PCA (Power Calibration Area) is assigned to the data lead-in zone in order to perform trial writing during recording power adjustment.

After the data lead-in zone, a user data zone is assigned to the recording layer L0. The user data is recorded from the innermost peripheral section to the outer peripheral section of the user data zone of the recording layer L0, and then, is recorded from the outermost peripheral section towards the inner peripheral section of the user data zone of the recording layer L1. Furthermore, the user data is recorded from the innermost peripheral section to the outer peripheral section of the user data zone of the recording layer L2, and finally, is recorded from the outermost peripheral section towards the inner peripheral section of the user data zone of the recording layer L3.

When the user data is recorded across from the recording layer L0 to the recording layer L1, an outer zone is set on the outermost peripheral section of the recording layers L0 and L1. In the outer zone, the user data is not recorded and information indicating that that section is the outer zone is recorded. Furthermore, when the user data is recorded across from the recording layer L1 to the recording layer L2, an inner zone is set on the innermost peripheral section of the recording layers L1 and L2. The user data is not recorded in the inner zone, either, and information indicating that that section is the inner zone is recorded. Furthermore, when the user data is recorded across from the recording layer L2 to the recording layer L3, an outer zone is set on the outermost peripheral section of the recording layers L2 and L3. Then, when recording of the user data is ended on the recording layer L3 and a finalizing process is thereafter performed, a lead-out zone is set in an inner peripheral direction of the recording layer L3 after a data end position. Lead-out information indicating a recording end in the disk is recorded in the lead-out zone.

When recording of user data is ended on the recording layer L2 and a finalizing process is thereafter performed, a lead-out zone is set in an outer peripheral direction of the recording layer L2 after the data end position, and lead-out information is recorded in the lead-out zone. In this case, the recording layer L3, while in a not-yet-recorded state (non-used), is unusable.

When recording of the user data is ended on the recording layer L1 and a finalizing process is thereafter performed, a lead-out zone is set in the inner peripheral direction of the recording layer L1 after the data end position, and lead-out information is recorded in the lead-out zone. In this case, the recording layers L2 and L3, while in a not-yet-recorded state (non-used), are unusable. Likewise, when recording is ended on the recording layer L0 and the process is finalized, lead-out information is recorded in the recording layer L0 and the remaining recording layers L1 to L3 are unusable.

The pitch of the groove formed in each recording layer of the BCA placing region 12 is several times larger than the pitch of the groove formed in each recording layer of the data region 13. Furthermore, the pitch of the groove formed in the system lead-in zone, out of the grooves formed in each recording layer of the data region 13, is larger than the other grooves of the data region 13 to facilitate reproducing of the pre-recorded information from the system lead-in zone.

In this manner, the four recording layers are present in the optical disk 10 according to the present embodiment, and recording is enabled with respect to each recording layer. However, when the four recording layers are thus present, a defect may occur in any one of the recording layers due to a flaw, etc., during disk manufacture. As a result, after producing of the recording layers, an inspection is performed with respect to whether or not there is a defect in each recording layer of the disk 10. Such an inspection is performed using an inspecting device.

Figure 4B:
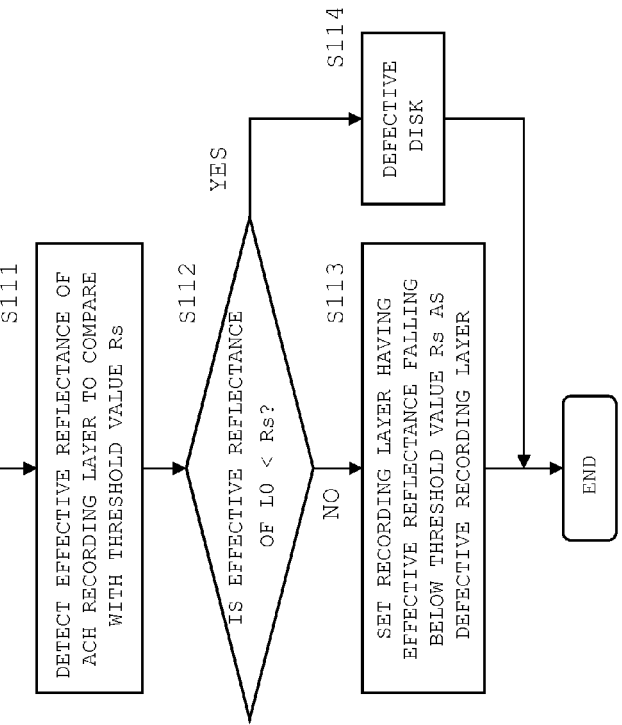
FIGS. 4A and 4B are flowcharts showing an operation for determining a defective recording layer according to the embodiment, respectively.
Figure 4A:
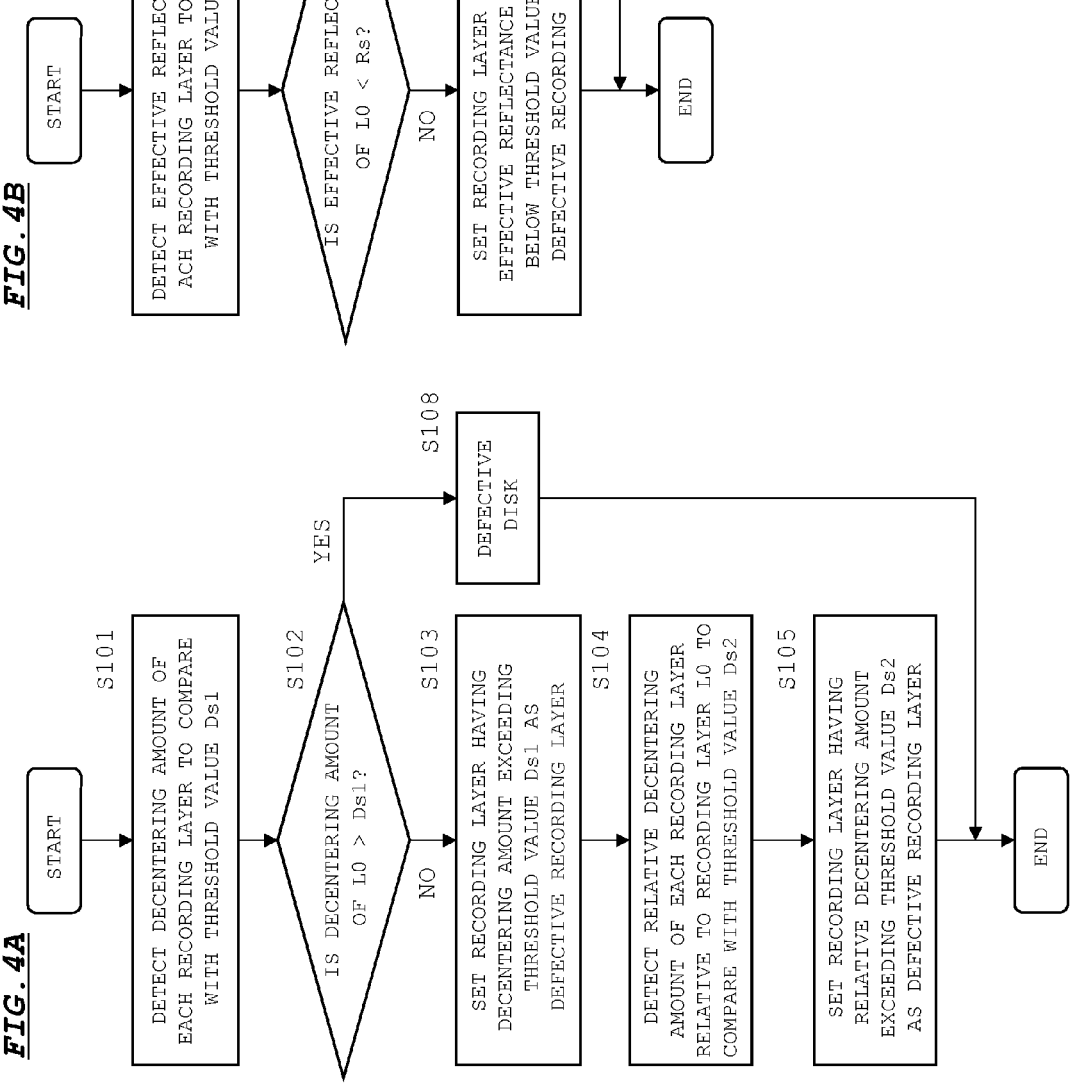

FIG. 4A is a flowchart showing a process when determining whether or not there is a defect in each recording layer based on an amount of decentering of the track (groove) formed in each recording layer.

In the determination process, firstly, the decentering amount of the track formed in each recording layer is detected, and the detected decentering amount is compared with a threshold value Ds1 (S101). The decentering amount is for example detected with reference to a push-pull signal (tracking error signal) produced based on reflected light from a target recording layer. That is, firstly, a tracking servo is turned OFF and a laser spot is focused on the target recording layer on the disk 10. When the disk is rotated in this state, a total number of tracks intersecting the laser spot while the disk 10 makes one rotation is detected as a decentering amount for the target recording layer.

In the comparison performed at S101, when it is determined that the decentering amount of the recording layer L0 exceeds the threshold value Ds1 (S102:YES), it is determined that the disk 10 is a defective disk (S108).

When the decentering amount of the recording layer L0 does not exceed the threshold value Ds1 (S102: NO), the recording layer, out of the other recording layers L1, L2, and L3, in which the decentering amount exceeds the threshold value Ds1 is set as a defective recording layer (S103).

A relative decentering amount for the recording layers L1, L2, and L3 is evaluated with respect to the recording layer L0 using a difference between the decentering amount of the recording layer L0 and the decentering amounts of the recording layers L1, L2, and L3. The evaluated relative decentering amounts are respectively compared with a threshold value Ds2 (S104). The recording layer, out of the recording layers L1, L2, and L3, in which the relative decentering amount exceeds the threshold value Ds2 is set as a defective recording layer (S105).

Therefore, in the determination flow in FIG. 4A, the recording layer, out of the recording layers L1, L2, and L3, in which the decentering amount exceeds the threshold value Ds1 or the relative decentering amount exceeds the threshold value Ds2 is set as a defective recording layer (S103 and S105). In this case, since the recording layer L0 is not a defective recording layer, the disk 10 is designated as valid. In contrast, when the recording layer L0 is defective (S102: YES), the disk itself is a defective disk (S108). As a result, in this flow, there is no change that the disk is set valid and the recording layer L0 is set as a defective recording layer. The reason for the determination of disk validity in this manner is that the recording layer L0 is used as a reference recording layer of the disk 10.

FIG. 4B is a flowchart showing a process when determining a defect in each recording layer based on an effective reflectance from each recording layer. The effective reflectance is a ratio (Lp-emitt/Lp-receive) of an emitting power (Lp-emitt) of a laser light source (optical pickup apparatus) and a light-receiving power (Lp-receive) of a photodetector (optical pickup apparatus) when laser light is focused on the target recording layer.

When laser light is focused on the recording layer L1, the laser light is attenuated by the recording layers L3 and L2 prior to arriving at the recording layer L1, and is further attenuated by the recording layers L2 and L3 even after being reflected by the recording layer L1. On the other hand, appropriate reproducing of the recording layer L1 requires receipt at a sufficient intensity of the laser light reflected by the recording layer L1 by the photodetector within the optical pickup apparatus.

The effective reflectance is an index for measurement of whether the laser light is incident upon the photodetector at a sufficient intensity when the laser light is focused on the target recording layer. That is, with respect to a recording layer with a small effective reflectance, even when the laser light is focused on that recording layer, laser light with a sufficient intensity is not incident upon the photodetector within the optical pickup apparatus. Thus, this recording layer should be designated as an unsuitable defective recording layer for recording or reproducing.

When the disk 10 is manufactured appropriately, the effective reflectance is substantially the same value for each recording layer. However, in the step of manufacturing a disk, for example, when a flaw (inappropriate thickness, etc.) is present during the production of the recording layer 102, it is sometimes the case that the effective reflectance will be reduced in a certain recording layer 102. In the flowchart shown in FIG. 4B, recording layers in which the effective reflectance is less than a threshold value are determined to be a defective recording layer unsuitable for recording or reproducing.

In the determination process, firstly, the effective reflectance of each recording layer is detected, and then, the respective detected effective reflectances are compared with a threshold value Rs (S111). In this comparison, when it is determined that the effective reflectance of the recording layer L0 is less than the threshold value Rs (S112: YES), it is determined that the disk 10 is a defective disk (S114).

When the effective reflectance of the recording layer L0 is not less than the threshold value Rs (S112: NO), the recording layer, out of the other recording layers L1, L2, and L3, in which the effective reflectance is less than the threshold value Rs is set as a defective recording layer (S113). In this case, the disk 10 is designated as valid. In contrast, when the recording layer L0 is defective (the effective reflectance is less than the threshold value Rs), the disk itself is a defective disk (S114). As a result, in the flowchart in FIG. 4B, there is no chance, either, that the disk is set valid and the recording layer L0 is set as a defective recording layer. The reason for the determination of disk validity in this manner is that, similarly to FIG. 4A, the recording layer L0 is used as a reference recording layer of the disk 10.

Figure 5B:
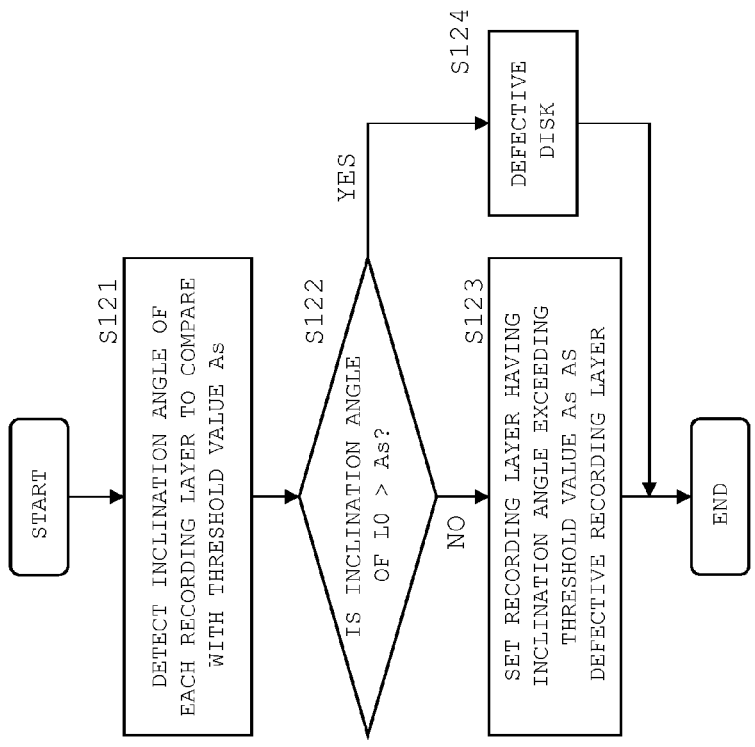
FIG. 5B is a flowchart showing an operation for determining a defective recording layer according to the embodiment.
Figure 5A:
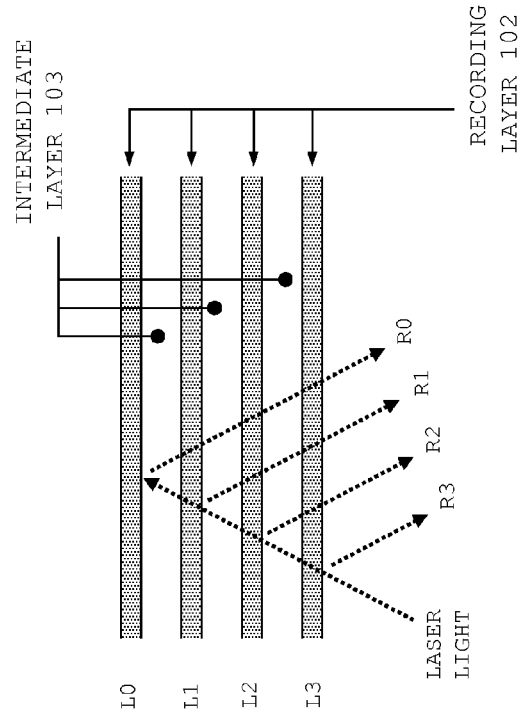
FIG. 5A is a diagram for explaining a method of determining the defective recording layer according to the embodiment.

FIG. 5B is a flowchart showing a process when determining defects in each recording layer based on an inclination angle of each recording layer. The inclination angle of each recording layer, as shown in FIG. 5A, is evaluated by using a positional detector to detect a position of each reflected light (R0 to R3) from each recording layer when laser light is incident from a sloping direction on each recording layer in a state that the disk 10 is mounted on a clamp face (turn table).

When the disk 10 is manufactured appropriately, each recording layer is substantially parallel to the clamp face. However, during the step of manufacturing a disk, for example, when there is a flaw (thickness non-uniformity, etc.) when producing the intermediate layer 103, it is sometimes the case that a certain recording layer is inclined considerably towards the clamp face. When the recording layer is thus inclined, the reflected light from the recording layer is not appropriately incident upon the photodetector (optical pickup apparatus) and a smooth recording/reproducing operation cannot be performed with respect to that recording layer. In the flowchart in FIG. 5B, a recording layer in which the inclination exceeds a threshold value As is determined to be a defective recording layer unsuitable for recording/reproducing.

In the determination process, firstly, the inclination angle of each recording layer is detected, and the detected inclination angle is compared with the threshold value As (S121) In this case, the inclination angles are detected at a plurality of detection points (at which a radial direction position and a peripheral direction position are differed) for each recording layer.

When it is determined in this comparison that any of the inclination angles detected with respect to the recording layer L0 exceeds the threshold value As (S122: YES), the disk 10 is determined to be a defective disk (S124).

When none of the inclination angles of the recording layer L0 exceeds the threshold value As (S122: NO), a recording layer, which is selected out of the other recording layers L1, L2, and L3, which is acquired at S121, and which has any of the inclination angles exceeding the threshold value As, is set as a defective recording layer (S123). In this case, the disk 10 is designated as valid. In contrast, when the recording layer L0 is defective (the inclination angle exceeds the threshold value), the disk itself is designated as a defective disk (S124) As a result, in the flowchart in FIG. 5B, there is no setting in which the disk is valid and the recording layer L0 is a defective recording layer. The reason for the determination of disk validity in this manner is that similarly to FIG. 4A and FIG. 5B, the recording layer L0 is used as a reference recording layer for the disk 10.

By using the determination flow in FIGS. 4A and 4B and FIG. 5B, presence or absence of defects with respect to each recording layer L0 to L3 of the disk 10 is set. It should be noted that the above-described process illustrates an example of the determination of defects and the determination of the presence or absence of defects for each recording layer may be performed by a different determination flow. Moreover, the determination of defects may be performed by determining defects in the wobble during disk molding, by spots occurring in the recording layer, and so on.

In the present embodiment, based on the determination results above, information showing validity (usability) of each recording layer is produced, and that information is written into the disk. More particularly, information showing a usable recording layer (hereinafter, "usable layer information") is included in the BCA information, and recorded in the BCA of the recording layer L0.

FIG. 6A is a flowchart showing a step when the BCA information is recorded in the BCA.

Firstly, the usable layer information is produced based on the determination results from the flow in FIGS. 4A and 4B and FIG. 5B above (S131). In this case, two steps, i.e., S132 and S133, may be employed to determine which of the recording layers is designated as usable.

At S132, all the recording layers other than the recording layer determined to be defective in the flow in FIGS. 4A and 4B and FIG. 5B are set as usable recording layers. In contrast, at S133, a recording layer before the recording layer determined to be defective in the flow in FIG. 4 and FIG. 5 are designated as unusable, and only a recording layers inward of the defective recording layer is designated as a usable layer. That is, at S133, when, for example, the recording layer L2 has a defect, the recording layers L2 and L3 are designated as unusable and recording layers L0 and L1 which are inward of the recording layer L2 are designated as usable recording layers.

When the usable recording layer is set and the usable layer information is produced in this manner, the BCA information is produced which includes this information and information (hereafter "layer-number information") indicating a total number of recording layers (including unusable recording layers) included in the disk 10. The produced BCA information is recorded in the BCA of the recording layer L0 (S134). The recording of the BCA information is performed by burning the recording layer of the BCA with high-power laser light, as described above.

FIG. 6B illustrates a data structure of the BCA information. Normal BCA information records disk ID information including disk manufacturer information, disk information indicating a disk size and a type of disk, and any other similar information. In the present embodiment, the usable layer information and the layer-number information are included in a "reserve area" assigned to $9^{th}$ to $15^{th}$ bytes of the "disk information".

Figure 7:
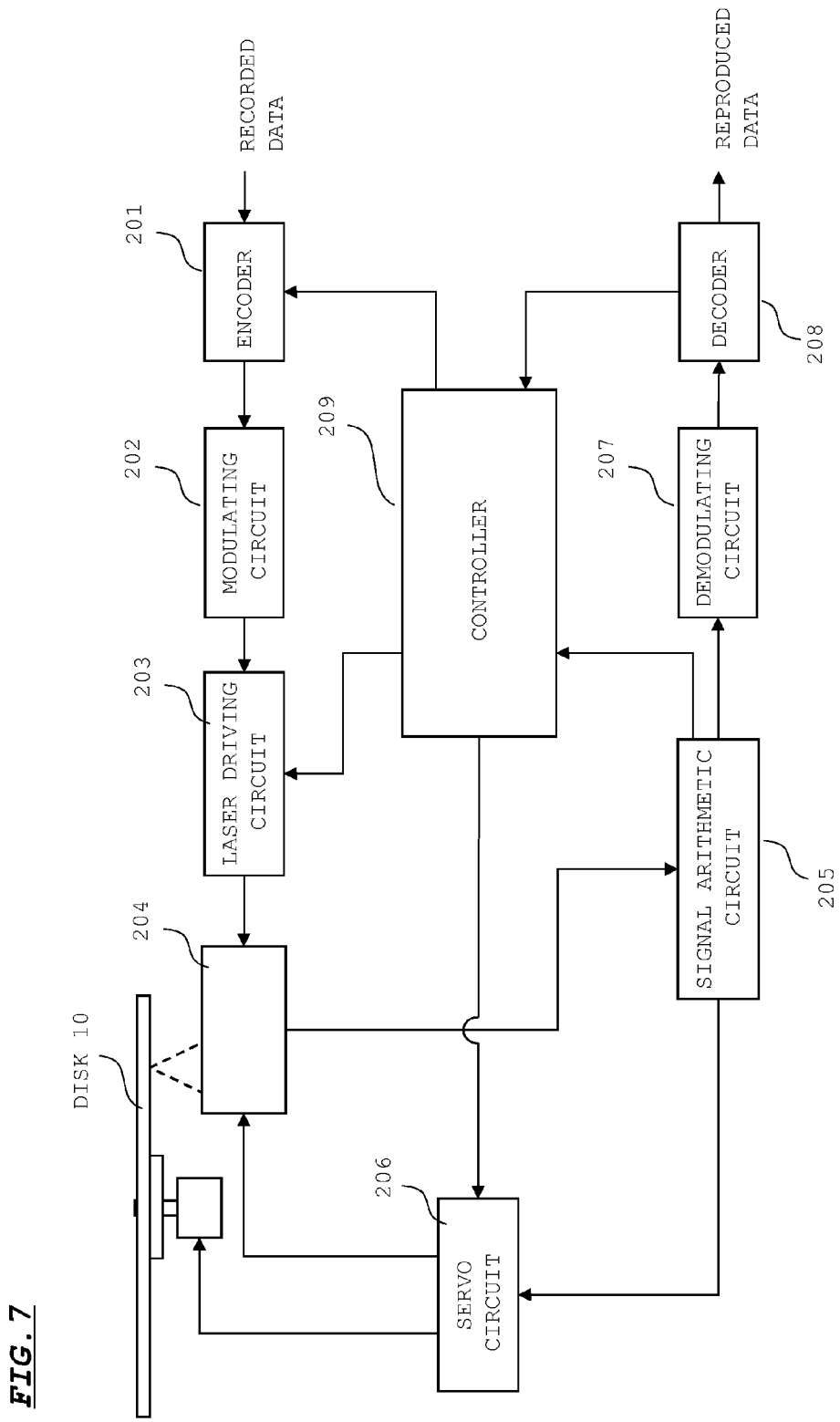
FIG. 7 shows the configuration of an optical disk apparatus according to the embodiment.

FIG. 7 shows the configuration of the optical disk apparatus according to the present embodiment. FIG. 7 shows only circuits associated with recording and reproducing.

In FIG. 7, an encoder 201 performs an encoding process such as adding an error-correction code to the recorded data. A modulating circuit 202 produces a recording signal by performing a predetermined modulation on the encoded data. A laser driving circuit 203 drives a semiconductor laser within an optical pickup apparatus 204 in response to commands from a controller 209. That is, during recording, high-power laser light that is modulated by a signal inputted from the modulating circuit 202 is outputted from the optical pickup apparatus 204, and during reproducing, laser light of a fixed level lower than that of recording power is outputted from the optical pickup apparatus 204.

The optical pickup apparatus 204 is provided with an optical system and an objective lens actuator for collecting laser light on the disk 10 and a photodetector for receiving reflected light from the disk 10. The optical pickup apparatus 204 is supported movably in a radial direction of the disk 10 by a pickup transfer mechanism (not shown).

A signal arithmetic circuit 205 performs an arithmetic process on a signal from the photodetector within the optical pickup apparatus 204 so as to produce various signals (a reproducing RF signal, a focus error signal, a tracking error signal, etc.), and supplies the signals to the corresponding circuits.

A servo circuit 206 produces a focus servo signal and a tracking servo signal from the focus error signal and the tracking error signal inputted from the signal arithmetic circuit 205, and supplies the signals to the objective lens actuator within the optical pickup apparatus 204. In addition, the servo circuit 206 controls tilt correction or aberration correction with respect to the optical pickup apparatus 204, and performs rotation control on the disk 10.

Furthermore, the servo circuit 206 performs focus pull-in control for pulling in laser light to the target recording layer in the disk 10 in response to a control signal from the controller 209, and focus search control for detecting a total number of recording layers included in the disk 10.

The demodulating circuit 207 demodulates the inputted reproducing RF signal, a wobble signal, and a waveform signal during BCA reading. The decoder 208 performs a decoding process on the demodulated data inputted from the demodulating circuit 207. Out of the decoded data, the BCA information, the pre-recorded information, and the data lead-in information are supplied to the controller 209 and held in a memory within the controller 209.

The controller 209 is provided with an MPU (Micro Processing Unit) and a memory, and controls each unit according to a control program accommodated in the memory.

Figure 8:
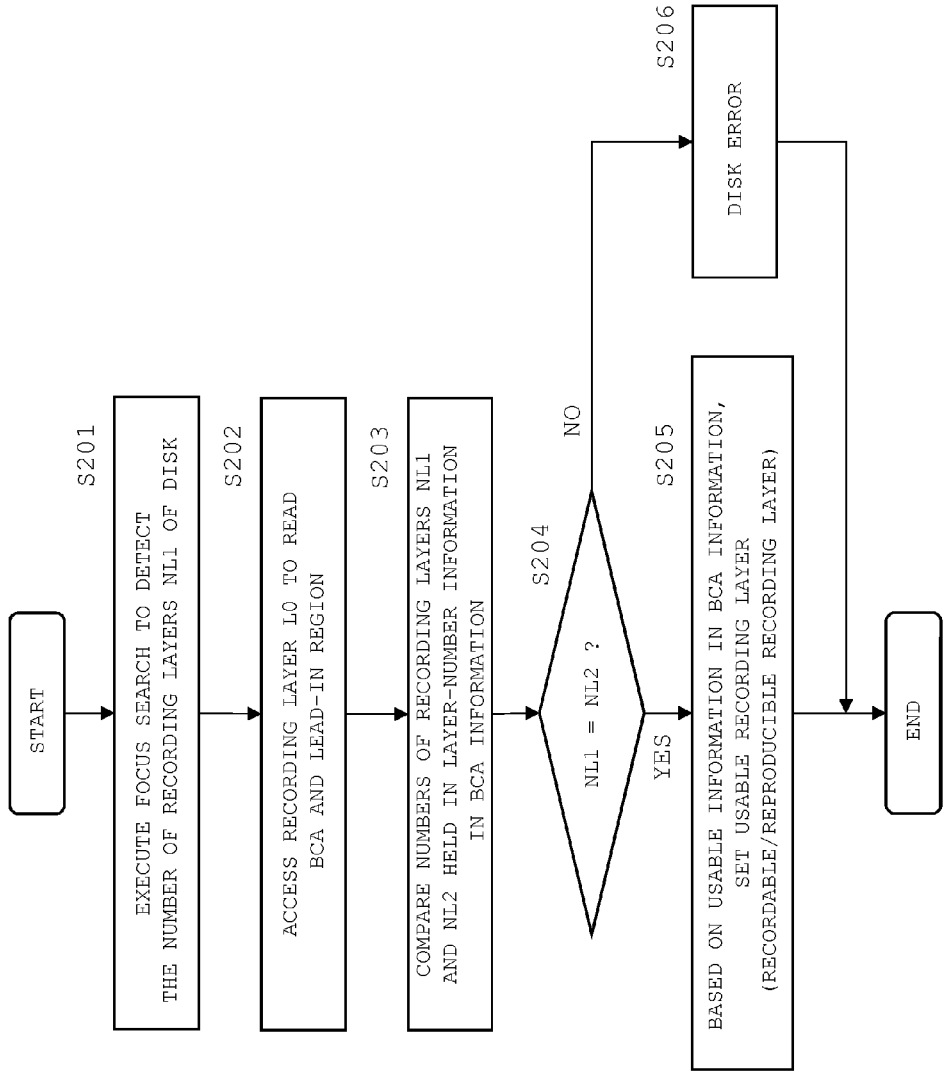
FIG. 8 is a flowchart showing a process during attachment of the disk, according to the embodiment.

FIG. 8 illustrates a processing flow performed under the control of the controller 209 when a disk is attached.

When the disk 10 is attached, the controller 209 causes the servo circuit 206 to perform focus search. During focus search, the controller 209 refers to the focus error signal inputted from the signal arithmetic circuit 205 so as to detect a total number NL1 of recording layers included in the disk 10 (S201). More particularly, the controller 209 counts the number of letter S-shaped curves appearing on the focus error signal during focus search operation so as to detect the total number NL1 of recording layers.

Subsequently, the controller 209 outputs a command to read out the BCA and the lead-in region on the recording layer L0, to the servo circuit 206. When this command is received, the servo circuit 206 controls the optical pickup apparatus 204 so as to perform reading of the BCA and the lead-in region. In this manner, the BCA information, the pre-recorded information, and the data lead-in information are reproduced, and that information is supplied to the controller 209. The controller 209 accommodates the supplied information in an internal memory (S202).

When the disk 10 is in a not-yet-recorded state, the data lead-in information is not reproduced. Thus, in this case, only the BCA information and the pre-recorded information are accommodated in the internal memory of the controller 209. In the BCA information, as described above, the layer-number information and the usable layer information are included.

After a certain period of time, the controller 209 compares the total number NL1 of recording layers optically detected at S201 with a total number NL2 of recording layers by the layer-number information acquired from the disk 10 at S202 (S203). Unless NL1=NL2 (S204: NO), the controller 209 designates the BCA information as inappropriate and cancels the process on the disk 10. In this case, for example, the disk 10 is unloaded or a disk error indication is performed, thereby notifying a user that the disk 10 is not appropriate (S206).

On the other hand, when the total numbers NL1 and NL2 of recording layers are mutually equal (S204: YES), the controller 209 sets the usable recording layers with respect to the disk 10 based on the usable layer information in the BCA information (S205). After a certain period of time, when a recording command or a reproducing command is inputted by a user, the controller 209 executes recording/reproducing control with respect to the usable recording layers set at S205.

Figure 9:
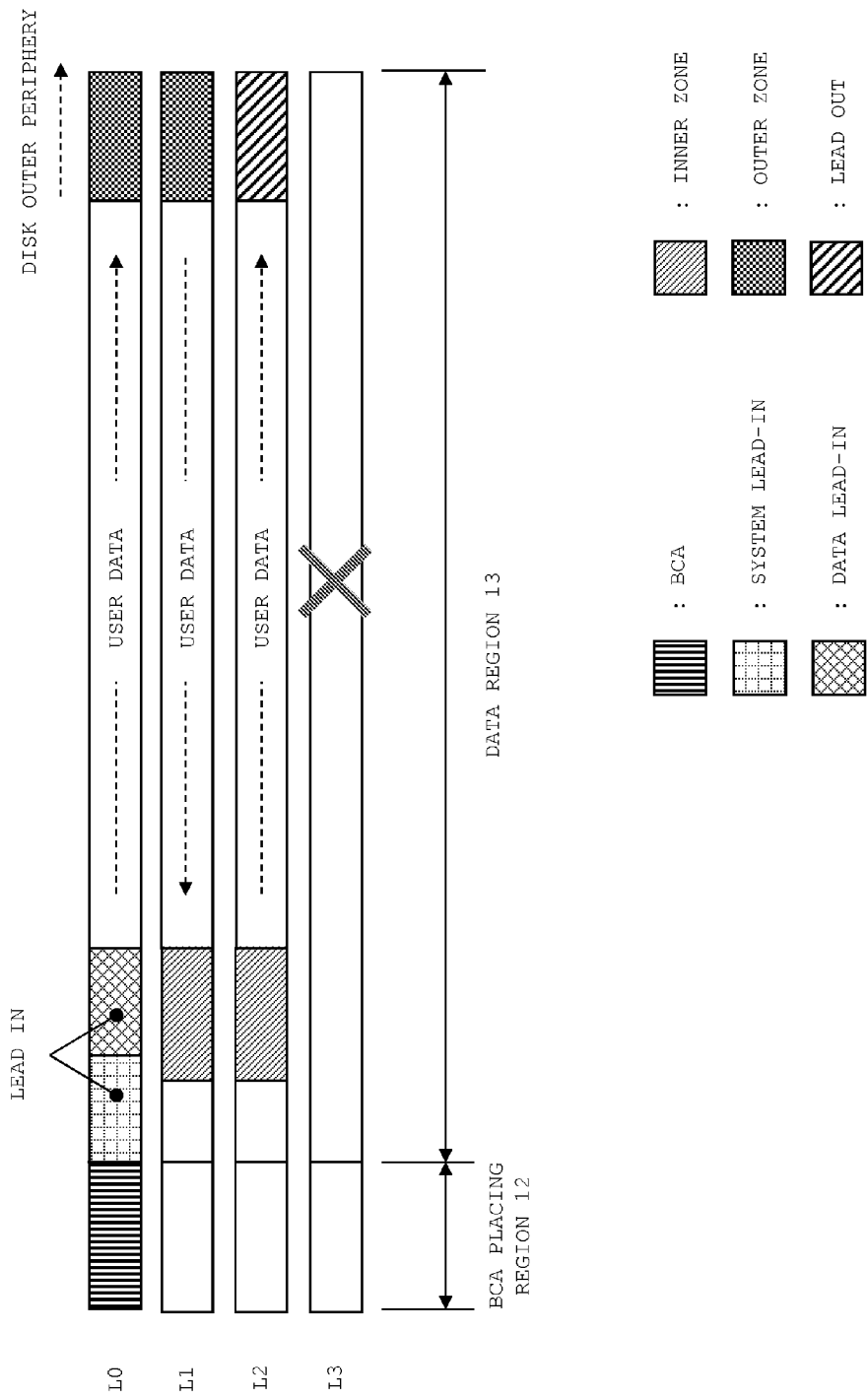
FIG. 9 is a diagram for explaining a recording operation according to the embodiment.

FIG. 9 shows a recording operation when the recording layer L3 is unusable.

In this case, user data is recorded in a user data zone of the recording layers L0, L1, and L2. That is, when the user data is recorded from a terminal end position towards an outer peripheral section of the data lead-in zone of the user data zone of the recording layer L0 and the recording is performed up to the outermost peripheral section of the user data zone of the recording layer L0, recording is performed from the outermost peripheral section towards the inner peripheral section of the user data zone of the recording layer L1. Furthermore, when recording is performed up to the innermost peripheral section of the user data zone of the recording layer L1, recording is performed from the innermost peripheral section towards the outer peripheral section of the user data zone of the recording layer L2. When recording is performed up to the outermost peripheral section of the user data zone of the recording layer L2, a lead-out zone is set in the outer peripheral section of the recording layer L2 and the lead-out information is recorded therein.

FIG. 10 shows a recording operation when the recording layer L2 is unusable.

In this case, the user data is recorded in a user data zone in the recording layers L0, L1, and L3. That is, when the user data is recorded from the innermost peripheral section towards an outer peripheral section of the user data zone of the recording layer L0 and recording is performed up to the outermost peripheral section of the user data zone of the recording layer L0, recording is performed from the outermost peripheral section towards the inner peripheral section of the user data zone of the recording layer L1. Furthermore, when recording is performed up to the innermost peripheral section of the user data zone of the recording layer L1, the recording operation jumps to the outermost peripheral section of the recording layer L3 and recording is performed from the outermost peripheral section towards the inner peripheral section of the user data zone of the recording layer L3. When recording is performed on the recording layer L3 and the finalizing process is thereafter performed, the lead-out zone is set in the inner peripheral section of the recording layer L3 and the lead-out information is recorded therein.

In FIG. 10, only the recording layer L2, out of the recording layers L2 and L3, is unusable. This results from the step at S132 in the flow in FIG. 6A being performed when the defective recording layer is the recording layer L2. When the step at S133 in FIG. 6A is performed if the defective recording layer is the recording layer L2, as shown in FIG. 11, not only the recording layer L2, but also the recording layer L3 which is disposed before the layer L2 is designated as unusable.

In this case, the user data is recorded in the user data zone of the recording layers L0 and L1. That is, when the user data is recorded from the innermost peripheral section towards an outer peripheral section of the user data zone of the recording layer L0 and recording is performed up to the outermost peripheral section of the user data zone of the recording layer L0, recording is performed from the outermost peripheral section towards the inner peripheral section of the user data zone of the recording layer L1. When recording is performed on the recording layer L1 and the finalizing process is thereafter performed, the lead-out zone is set in the inner peripheral section of the recording layer L1 and the lead-out information is recorded therein. It becomes thereby understood that an area after a final address of the recording layer L1 is "lead out" and the user data is not present in the recording layers before the recording layer L1.

When a usable recording layer is set as shown in FIG. 11, in comparison to a situation shown in FIG. 10, a recording capacity of the overall disk 10 is decreased by a recording capacity of the recording layer L3. On the other hand, when the usable recording layer is set as shown in FIG. 10, a large jump must be performed from the innermost peripheral section of the recording layer L1 to the outermost peripheral section of the recording layer L3 when reproducing the user data, and there is a possibility that the seamlessness of the data is destructed. In contrast, in the setting method shown in FIG. 11, since there is no necessity for a large jump between the recording layers when reproducing the data, there is little tendency for destruction of the seamlessness of the data. In this manner, although the recording capacity of the overall disk is reduced by two layers, since there is no jump occurring between the innermost periphery and outermost periphery of the disk, an access time is shortened and a seamless reproducing of moving-image data can be performed.

Thus, which of the setting methods, that in FIG. 10 or that in FIG. 11, i.e., which of the steps, that at S132 and that at S133 in FIG. 6A, should be decided, as needed, based on the relationship between the recording capacity of the disk and ensuring of seamlessness during reproducing the data.

When the disk 10 on which recording has been performed in the above manner is attached on the optical disk apparatus, an initial operation as shown in FIG. 8 is executed and the usable recording layer with respect to the disk 10 is set. Thereafter, when a reproducing command is inputted to the disk 10, the reproducing operation is executed based on the data lead-in information.

In this case, the data lead-in information should not include link information linking to an unusable recording layer or address information making an unusable recording layer a reproducing position. Therefore, when information relating to reproducing of an unusable recording layer is included in the data lead-in information, it is determined that that data lead-in information is not appropriate. That is, during the preceding recording operation on the disk 10, there is a possibility that the data lead-in information is not recorded appropriately and when the unusable recording layer is reproduced in accordance with this data lead-in information, there is a risk that an undesirable reproducing operation such as outputting noise is performed.

Figure 12A:
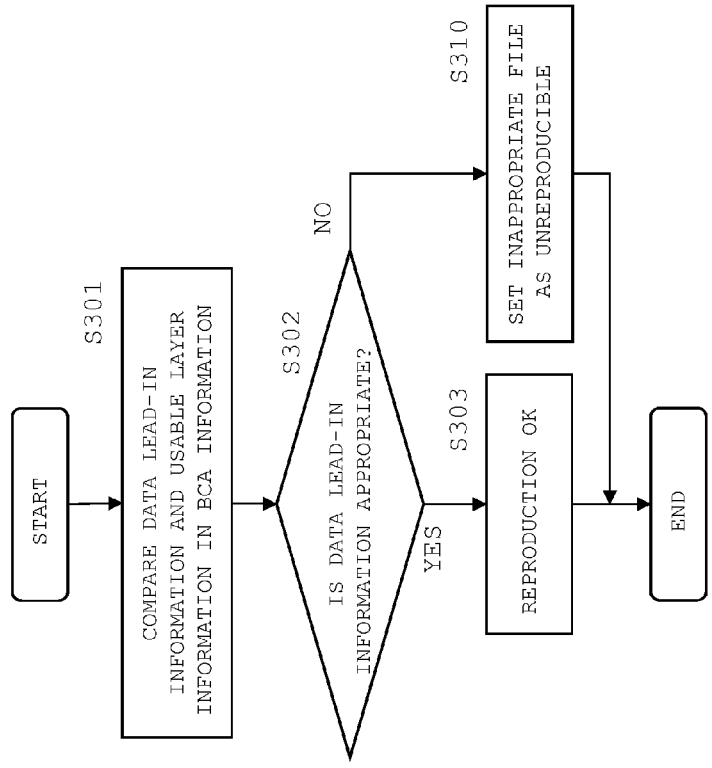
FIGS. 12A and 12B are flowcharts showing a control operation during reproduction, according to the embodiment, respectively.

In view of this fact, when executing the initial operation in FIG. 8, the controller 209 determines whether or not to reproduce, as shown in FIG. 12A. That is, the controller 209 refers to the usable layer information and the data lead-in information in the BCA information so as to determine whether information relating to reproduction of an unusable recording layer is included in the data lead-in information (S301). When the information relating to reproduction of an unusable recording layer is included in the data lead-in information, the data lead-in information is designated as inappropriate, the data lead-in information is designated as inappropriate (S302: NO) and the reproducing command to the disk 10 is not accepted (S304). On the other hand, when the information relating to reproduction of an unusable recording layer is not included in the data lead-in information, the data lead-in information is designated as appropriate (S302:YES), and the reproducing command to the disk 10 is accepted (S303).

Figure 12B:
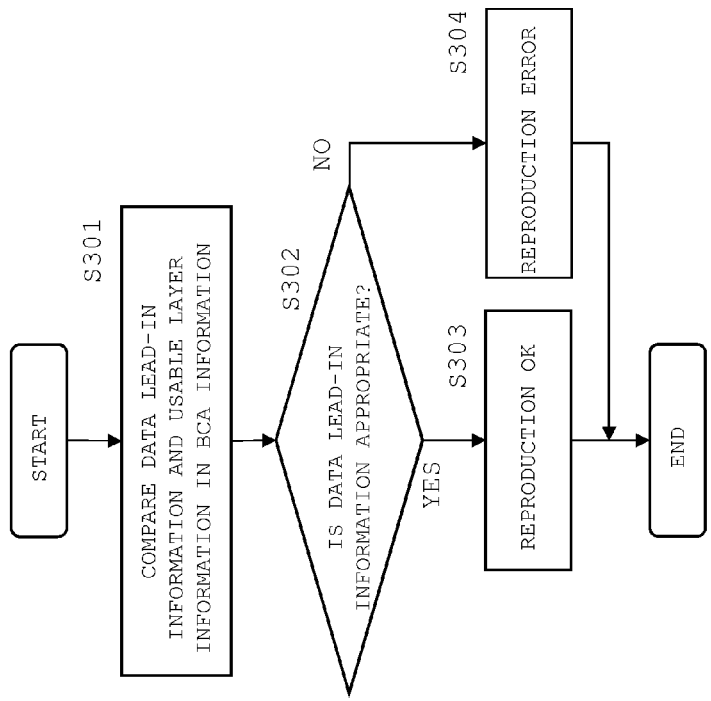

Alternatively, in substitution for such control, control may be so performed that only reproducing of the unusable recording layer is not accepted. For example, as shown in FIG. 12B, the controller 209 sets a file including reproduction of the unusable recording layer as unreproducible (S310) when information relating to reproducing of the unusable recording layer is included in the data lead-in information (S302:NO). When there is a reproducing command, if the file to be reproduced is set as unreproducible, reproducing of that file is not accepted. Conversely, unless set as unreproducible, the reproducing of the file is executed.

According to the embodiment, when any of the four recording layers is defective, the usable layer information indicating the defect is recorded in the BCA. The optical disk apparatus is then able to know the usability of any recording layer based on the usable layer information read from the BCA. Thus, the optical disk apparatus is able to perform recording/reproducing using other non-defective recording layers as a valid recording layer even when a defect is present in any of the four recording layers. Therefore, a disk 10 including a defect in a recording layer can be offered to a user as an appropriate disk, and as a result, it is possible to avoid loss of manufacturing costs and waste of materials.

In the embodiment, in spite of the fact that the four recording layers are physically present, since there are only three usable recording layers, for example, when introducing the disk as a commercial product into the market, sale by indicating the disk type by only the number of recording layers cannot be said to be a desirable method. Rather, when introducing the disk into the market, sale by indicating the disk type not by the number of recording layers but by the recordable capacity is preferred.

According to the embodiment, since the layer-number information relating to the total number NL2 of recording layers is included in the BCA information, how many recording layers are present in that disk can be recognized on the optical disk apparatus side. In this case, it is possible on the optical disk apparatus side to determine the BCA information, i.e., the appropriateness of the information relating to usability of the recording layer, by comparing the total number NL1 of the recoding layers optically recognized by the focus search or the like and the total number NL2 of recording layers acquired from the BCA information.

According to the embodiment, since the recording layer usable on the disk is set based on the usable layer information included in the BCA information, even when a recording layer with a defect is included in the disk, it is possible to record in recording layers other than that layer. Thus, a disk with a defect in a certain recording layer can be used without the need for abandonment, etc., and as a result, it is possible to avoid loss of disk manufacturing costs and waste of materials.

According to the embodiment, since the lead-out information is recorded in a recording layer used last, out of the usable recording layers, it is possible to determine the terminal end of the valid recording layer based on the lead-out information. Thus, reading beyond the valid recording layers can be prevented.

According to the embodiment, since the reproducible recording layer in the disk is set based on the usable layer information included in the BCA information, even when a recording layer with a defect is included in the disk, reproducing of recording layers other than that layer is possible. Thus, a disk with a defect in a certain recording layer can be used without the need for abandonment, etc., and as a result, it is possible to avoid loss of disk manufacturing costs and waste of materials.

To change a subject slightly, the embodiment is so described that a recording layer without a defect is set as a usable recording layer in the event that a defect occurs in a recording layer as a result of a flaw in a step of manufacturing a disk. However, even when all the recording layers are free from defects, for the purposes of adjusting the line-up of disks by a disk manufacturer or marketing entity, the usable layer information so configured that only predetermined recording layers are set as a usable recording layer may be recorded on the disk.

For example, in the embodiment, when there is not a defect in any of the four recording layers, usable layer information may be so configured that only the recording layers L0 and L1 are designated as usable recording layers.

In this manner, for example, when a disk manufacturing line forms four recording layers, it is possible to produce a disk in which only the two recording layers are designated as valid on the same manufacturing line without the requirement to install a manufacturing line forming two recording layers in addition to the first manufacturing line. In this case, since recording layers which are not used are always included in the produced disks, the manufacturing costs are increased in comparison to producing a disk including only two recording layers, it is, however, not required to install a separate manufacturing line for the manufacture of two recording layers, and as a result, large costs for the capital investment can be slashed. Furthermore, the need for stopping production of disk due to layout variation in the manufacturing line is also eliminated.

When only the two recording layers are valid out of four recording layers, it is possible to preset which of the recording layers are designated as valid recording layers prior to disk production. Therefore, it is possible to include the usable layer information not in the BCA but in the system lead-in zone. In this case, the usable layer information may be included in an empty area in the pre-recorded information recorded in the system lead-in zone. Specifically, this information may be added when creating a stamper.

Figure 13:
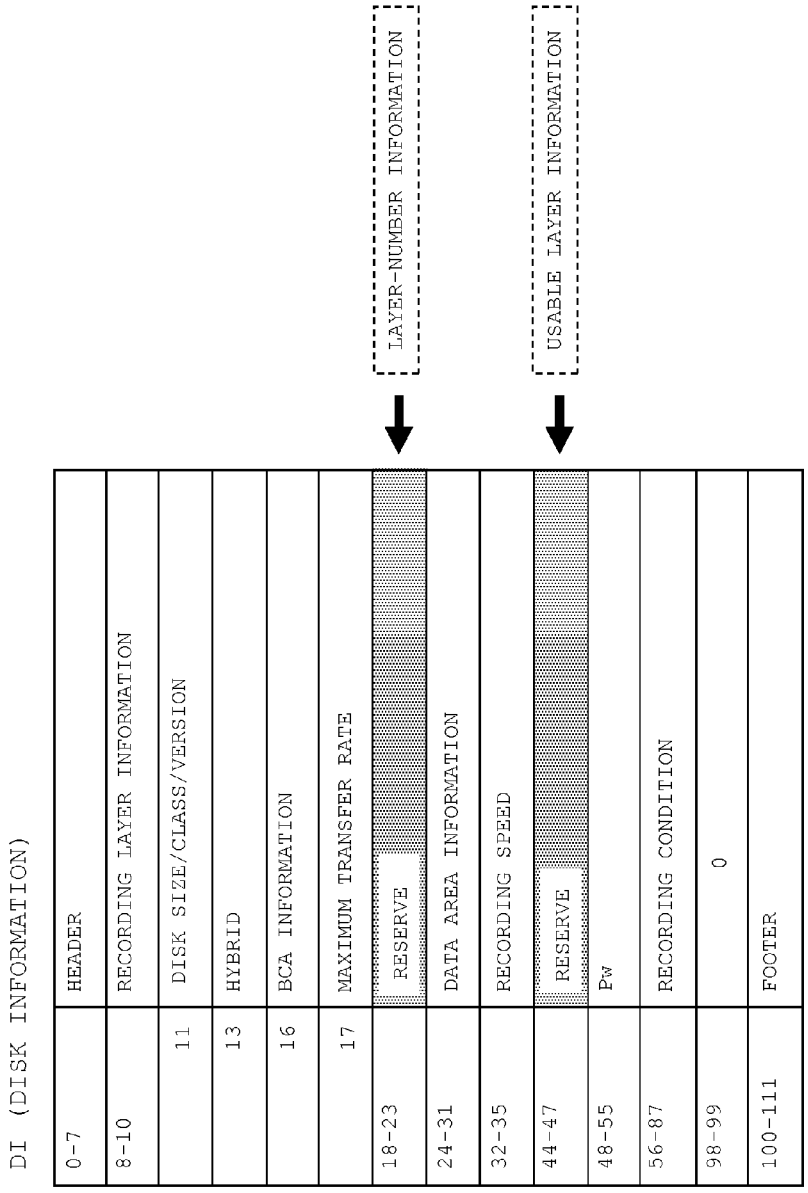
FIG. 13 is a diagram for explaining a method of configuring pre-recorded information according to the embodiment.

FIG. 13 shows a data structure of disk information (DI: Disk Information) out of the pre-recorded information. When the usable layer information is included in the pre-recorded information, for example, a reserve region in $44^{th}$ to $47^{th}$ bytes can be used. As shown in FIG. 13, since the reserve region is also present in $18^{th}$ to $23^{rd}$ bytes in the disk information, the layer-number information may be included by using this reserve region. In this manner, both the usable layer information and the layer-number information can be acquired at the same time by reproducing the system lead-in zone.

Thus, when producing the usable recording layer depending upon the relationship with the disk lineup, the flowchart in FIG. 8 and FIGS. 12A and 12B are modified to that in which the usable recording layer is set based on the pre-recorded information. That is, in the flowchart in FIG. 8, the comparison determination at S203 and S204 is performed based on the layer-number information in the pre-recorded information, and the setting at S205 is performed based on the usable layer information in the pre-recorded information. Furthermore, in the flowchart shown in FIGS. 12A and 12B, the comparison determination at S301 and S302 is performed based on the usable layer information in the pre-recorded information.

Even when the object is to adjust a disk lineup in this manner, there is a possibility that a defect occurs in the recording layer that is to be set as a usable recording layer. In this case, when the usable recording layer is set by the pre-recorded information, the defect is present in the recording layer set as usable, and as a result, a situation where the disk is designated as unusable is necessitated. Thus, in order to avoid such as case, as described in the embodiment, it is preferable to adjust the disk lineup based on the BCA information. In this manner, even when a defect is present in a recording layer that is to be set as a usable recording layer, it is possible to adjust the lineup by setting, as needed, a usable recording layer, out of the remaining recording layers, as being usable.

The embodiment of the present invention is thus described above. However, it is not intended that the present invention is limited to these particular embodiment and modified example. Moreover, the embodiment of the present invention can also be modified in various ways apart from the aforementioned description.

For example, in the embodiment, the use of a BD (BD-R) type in which recording is possible and re-writing is not possible and the optical disk apparatus performing recording/reproducing of such a disk is described as an example. However, the present invention is also applicable to a rewritable BD (BD-RE) and an optical disk apparatus performing recording/reproducing of such a disk, as needed.

Furthermore, although the example of the disk having the four recording layers is used in the embodiment, the number of recording layers is not limited to four, and a wide application of the present invention is possible also to disks having a plurality of recording layers and to an optical disk apparatus performing recording/reproducing of such disks.

Furthermore, the present invention can be applied, as needed, also to an optical disk other than a BD and to other optical disk apparatuses. Although the example is used in the embodiment of an optical disk apparatus enabling recording and reproducing, application of the present invention is possible to reproduction-only optical disk apparatuses.

Furthermore, in the embodiment, although the pre-recorded information is held by wobbling a groove formed in a system lead-in zone according to a predetermined modulating method, in substitution of this method, it is possible to hold the pre-recorded information by pit sequences.

Moreover, in the embodiment, although the total number of recording layers present within the disk is detected based on a focus error signal outputted during focus search, detection of the total number of recording layers may be performed using another optical means.

In the description, although an example is used of recording the usable layer information and the layer-number information in the BCA during disk manufacture, the invention is not limited in this respect, and a region for recording such information may be separately arranged and the information is recorded in this region during disk manufacture thereby to form a reproduction-only region.

Besides, the embodiment of the present invention may be modified in various ways, as needed, within the range of the technological idea set forth in the claims.

What is claimed is:

1. A recordable optical disk having a plurality of recording layers in a laminated direction, the optical disk comprising:
   a recordable region; and
   a read-only region, wherein in the read-only region, usability information by which usability of each of the recording layers is individually indicated is recorded, wherein when all the recording layers are determined as not being a defective recording layer, the usability information sets all the recording layers as being in a usable state, and when at least one of the recording layers is determined as being a defective recording layer, the usability information sets at least one of the recording layers not being determined as a defective recording layer, as being in a non-usable state.

2. The optical disk according to claim 1, wherein
in the read-only region, information about a total number of the recording layers is further recorded.

3. The optical disk according to claim 1, wherein
the usability information sets not only a first recording layer but also a second recording layer as being in a non-usable state, the first recording layer being determined as a defective recording layer, the second recording layer being determined as a non-defective recording layer but being later than the first recording layer in a recording order.

4. The optical disk according to claim 1, wherein
the read-only region includes a pre-recorded region formed therein with a recording structure in a track shape, the recording structure being formed when a stamper for the optical disk is created, and the usability information is recorded in the pre-recorded region.

\* \* \* \* \*